(12) United States Patent
Boes et al.

(10) Patent No.: US 8,939,512 B2
(45) Date of Patent: Jan. 27, 2015

(54) SEAT ASSEMBLY AND AN ADJUSTABLE HEAD RESTRAINT ASSEMBLY

(75) Inventors: Klaus Boes, Beilngries (DE); Achim Tscherbner, Allershausen (DE); Karsten Loehr, Erding (DE)

(73) Assignee: Lear Corporation, Southfield, MI (US)

( * ) Notice: Subject to any disclaimer, the term of this patent is extended or adjusted under 35 U.S.C. 154(b) by 610 days.

(21) Appl. No.: 12/761,770

(22) Filed: Apr. 16, 2010

(65) Prior Publication Data

US 2010/0283306 A1    Nov. 11, 2010

(30) Foreign Application Priority Data

May 6, 2009    (DE) .......................... 10 2009 020 117

(51) Int. Cl.
*B60N 2/48*  (2006.01)
*A47C 7/36*  (2006.01)

(52) U.S. Cl.
CPC ............ *B60N 2/4882* (2013.01); *B60N 2/4844* (2013.01); *B60N 2/4808* (2013.01); *B60N 2/485* (2013.01); *B60N 2/4864* (2013.01)
USPC .......................................... 297/408; 297/409

(58) Field of Classification Search
CPC .. B60N 2/4864; B60N 2/4844; B60N 2/4847; B60N 2/4817
USPC .................... 297/216.12, 408, 409
See application file for complete search history.

(56) References Cited

U.S. PATENT DOCUMENTS

| | | | |
|---|---|---|---|
| 3,563,602 A | 2/1971 | Ohta et al. | |
| 3,608,965 A | 9/1971 | Cziptschirsch et al. | |
| 4,191,422 A | 3/1980 | Inasawa et al. | |
| 4,265,482 A | 5/1981 | Nishimura et al. | |
| 4,668,014 A | 5/1987 | Boisset | |
| 4,671,573 A | 6/1987 | Nemoto et al. | |
| 4,674,797 A | 6/1987 | Tateyama | |
| 4,762,367 A * | 8/1988 | Denton ........................ 297/409 |
| 4,830,434 A | 5/1989 | Ishida et al. | |
| 4,923,250 A | 5/1990 | Hattori | |
| 5,445,434 A | 8/1995 | Kohut | |
| 5,669,668 A | 9/1997 | Leuchtmann | |
| 6,082,817 A | 7/2000 | Mueller | |
| 6,364,455 B1 | 4/2002 | Yang et al. | |

(Continued)

FOREIGN PATENT DOCUMENTS

| | | |
|---|---|---|
| DE | 19603911 A1 | 8/1997 |
| DE | 19714283 A1 | 11/1997 |

(Continued)

OTHER PUBLICATIONS

German Patent Office, Office Action for the corresponding German Patent Application No. 10 2008 060 641.3 mailed Oct. 28, 2009.

(Continued)

*Primary Examiner* — David R Dunn
*Assistant Examiner* — Tania Abraham
(74) *Attorney, Agent, or Firm* — Brooks Kushman P.C.

(57) ABSTRACT

A seat assembly having a headrest for supporting the head of a seat occupant. The seat assembly includes a seat back, a support post disposed on the seat back, and a headrest. The headrest has a front portion for supporting the head of a seat occupant. The front portion is configured to move between a first position and a second position. The headrest is rotatably disposed on the support post such that the headrest can rotate independent of movement of the front portion.

19 Claims, 7 Drawing Sheets

(56) References Cited

U.S. PATENT DOCUMENTS

| | | | |
|---|---|---|---|
| 6,390,558 B2 | 5/2002 | Fischer et al. | |
| 6,511,130 B2 * | 1/2003 | Dinkel et al. | 297/410 |
| 6,688,697 B2 | 2/2004 | Baumann et al. | |
| 6,692,071 B2 * | 2/2004 | Fowler | 297/216.12 |
| 6,715,829 B2 | 4/2004 | Svantesson et al. | |
| 6,767,064 B2 | 7/2004 | Veine et al. | |
| 6,805,411 B2 | 10/2004 | Gramss et al. | |
| 6,830,278 B2 * | 12/2004 | Yoshizawa et al. | 296/68.1 |
| 6,880,890 B1 | 4/2005 | DeBrabant | |
| 6,899,395 B2 | 5/2005 | Yetukuri et al. | |
| 6,910,740 B2 | 6/2005 | Baker et al. | |
| 6,926,367 B2 * | 8/2005 | Tomimatsu | 297/468 |
| 6,983,995 B1 | 1/2006 | Veine et al. | |
| 7,048,336 B2 | 5/2006 | Mawbey et al. | |
| 7,070,235 B2 | 7/2006 | Schilling et al. | |
| 7,073,863 B1 | 7/2006 | Low et al. | |
| 7,111,901 B2 | 9/2006 | Schlierf et al. | |
| 7,137,668 B2 | 11/2006 | Kreitler | |
| 7,144,083 B2 | 12/2006 | List et al. | |
| 7,195,313 B2 | 3/2007 | Hippel et al. | |
| 7,232,187 B1 | 6/2007 | Sundararajan et al. | |
| 7,237,842 B2 * | 7/2007 | Schmuda von Trzebiatowski et al. | 297/391 |
| 7,316,455 B2 | 1/2008 | Metz et al. | |
| 7,364,239 B2 * | 4/2008 | Clough | 297/391 |
| 7,427,108 B2 | 9/2008 | Hermansson et al. | |
| 7,431,400 B2 | 10/2008 | Brawner | |
| 7,517,015 B2 * | 4/2009 | Terada et al. | 297/216.12 |
| 7,562,936 B1 | 7/2009 | Veine et al. | |
| 7,669,932 B1 | 3/2010 | Gronninger et al. | |
| 7,735,929 B2 | 6/2010 | Veine et al. | |
| 7,758,127 B2 | 7/2010 | Bokelmann et al. | |
| 8,066,330 B2 | 11/2011 | Keller et al. | |
| 2001/0028191 A1 | 10/2001 | Lance | |
| 2001/0040396 A1 | 11/2001 | Kreuels et al. | |
| 2003/0103140 A1 | 6/2003 | Watkins | |
| 2004/0108766 A1 | 6/2004 | Baker et al. | |
| 2004/0195894 A1 | 10/2004 | Pal et al. | |
| 2005/0077762 A1 | 4/2005 | Kraemer et al. | |
| 2005/0116515 A1 | 6/2005 | Schlierf et al. | |
| 2005/0146190 A1 | 7/2005 | Taatjes | |
| 2006/0071518 A1 | 4/2006 | Hippel et al. | |
| 2006/0186720 A1 | 8/2006 | Linardi et al. | |
| 2006/0214491 A1 | 9/2006 | Metz et al. | |
| 2006/0226688 A1 | 10/2006 | Terada et al. | |
| 2006/0250017 A1 | 11/2006 | Otto et al. | |
| 2007/0164593 A1 | 7/2007 | Brockman | |
| 2007/0170766 A1 | 7/2007 | Brawner | |
| 2007/0216211 A1 | 9/2007 | Mori | |
| 2007/0284925 A1 | 12/2007 | Balensiefer | |
| 2008/0001456 A1 | 1/2008 | Muller et al. | |
| 2008/0203801 A1 | 8/2008 | Jammalamadaka et al. | |
| 2008/0277989 A1 | 11/2008 | Yamane et al. | |
| 2009/0058162 A1 | 3/2009 | Boes et al. | |
| 2009/0058163 A1 | 3/2009 | Bokelmann et al. | |
| 2009/0146479 A1 | 6/2009 | Boes et al. | |
| 2009/0184556 A1 | 7/2009 | Bokelmann et al. | |
| 2009/0243364 A1 | 10/2009 | Brunner et al. | |
| 2010/0019559 A1 | 1/2010 | Smith | |
| 2010/0219670 A1 | 9/2010 | Jammalamadaka et al. | |
| 2012/0126605 A1 | 5/2012 | Gross et al. | |

FOREIGN PATENT DOCUMENTS

| | | | |
|---|---|---|---|
| DE | 19632560 A1 | | 2/1998 |
| DE | 19737706 C1 | | 1/1999 |
| DE | 10035972 A1 | | 2/2001 |
| DE | 10063719 A1 | * | 7/2001 |
| DE | 10006099 A1 | | 8/2001 |
| DE | 10043923 A1 | | 4/2002 |
| DE | 10224060 C1 | * | 7/2003 |
| DE | 102004005695 A1 | | 8/2004 |
| DE | 10312517 A1 | | 10/2004 |
| DE | 102004030933 B3 | | 8/2005 |
| DE | 102004055986 A1 | | 6/2006 |
| DE | 102005020276 B3 | | 9/2006 |
| DE | 102006015785 A1 | | 10/2006 |
| DE | 102007048152 B3 | | 1/2009 |
| DE | 10200806064 A1 | | 6/2009 |
| DE | 102008060641 A1 | | 6/2009 |
| EP | 582765 B1 | * | 11/1995 |
| EP | 1717099 A2 | | 11/2006 |
| FR | 2852066 A1 | | 9/2004 |
| GB | 2302706 A | | 1/1997 |
| GB | 2340744 A | | 3/2000 |
| GB | 2418850 A | | 4/2006 |
| WO | 2004089688 A1 | | 10/2004 |
| WO | 2007073034 A1 | | 6/2007 |

OTHER PUBLICATIONS

German Patent Office, Office Action for the corresponding German Patent Application No. 10 2008 060 641.3-16 mailed Nov. 29, 2009.

* cited by examiner

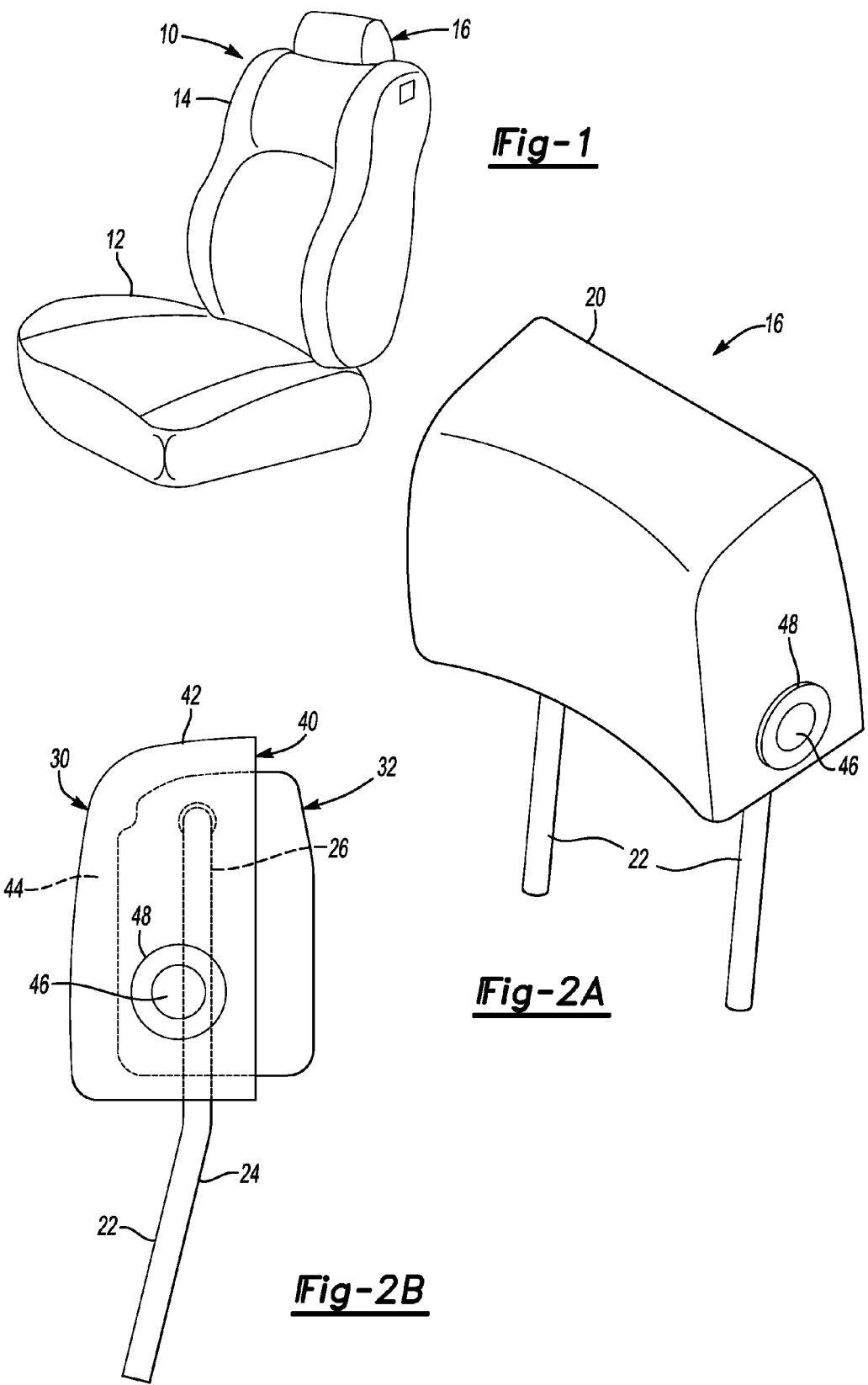

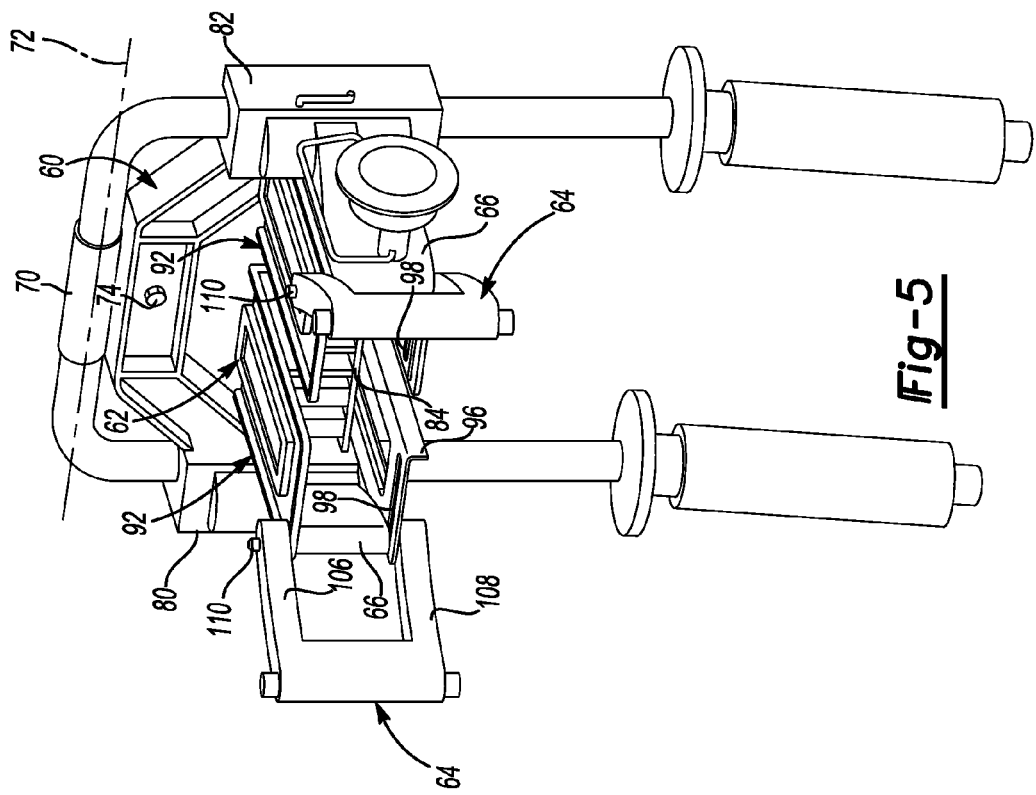
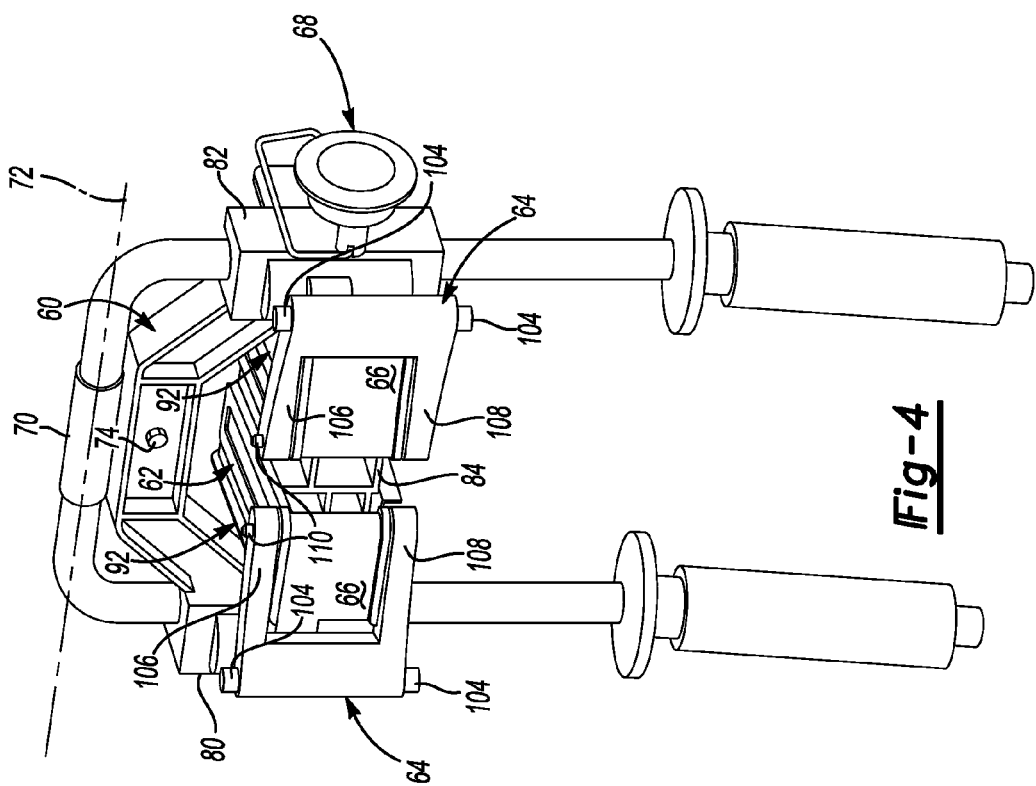

US 8,939,512 B2

SEAT ASSEMBLY AND AN ADJUSTABLE HEAD RESTRAINT ASSEMBLY

CROSS-REFERENCE TO RELATED APPLICATIONS

The application claims foreign priority benefits under 35 U.S.C. §119(a)-(d) to DE 10 2009 020 117.3, filed May 6, 2009, which is hereby incorporated by reference in its entirety.

BACKGROUND OF THE INVENTION

Field of the Invention

The present invention relates to a seat assembly and an adjustable head restraint assembly.

SUMMARY OF THE INVENTION

In at least one embodiment, a seat assembly is provided. The seat assembly includes a seat back, a support post disposed on the seat back, and a headrest. The headrest has a front portion for supporting the head of a seat occupant. The front portion is configured to move between a first position and a second position that differs from the first position. The headrest is rotatably disposed on the support post such that the headrest can rotate independent of movement of the front portion.

In at least one other embodiment, a seat assembly is provided. The seat assembly includes a seat back and a head restraint assembly. The head restraint assembly includes a headrest, a support post, a subframe, a pivot member, and a support linkage. The support post is disposed on the seat back. The subframe is rotatably disposed on the support post. The pivot member is moveable with respect to the subframe and is configured to engage the headrest. The support linkage is rotatably disposed on the subframe and moveably associated with the pivot member. Movement of the pivot member with respect to the subframe is independent of rotation of subframe with respect to the support post.

In at least one other embodiment, a seat assembly is provided. The seat assembly includes a seat back and a head restraint assembly. The head restraint assembly includes a headrest having a front portion for supporting the head of a seat occupant, a support post, a subframe, a support frame, and a pivot member. The support post is disposed on the seat back. The subframe is rotatably disposed on the support post. The support frame is disposed on the subframe. The pivot member is moveably disposed on the support frame and configured to engage the front portion. Movement of the pivot member with respect to the support frame is independent of rotation of subframe with respect to the support post.

BRIEF DESCRIPTION OF THE DRAWINGS

FIG. 1 is a perspective view of a seat assembly.

FIGS. 2a and 2b are perspective and side views of an embodiment of a head restraint assembly disposed in a retracted position.

FIG. 4 is a fragmentary perspective view of a portion of the head restraint assembly disposed in the retracted position.

FIG. 5 is a fragmentary perspective view of a portion of the head restraint assembly disposed in the extended position.

DETAILED DESCRIPTION

Figure 3A:
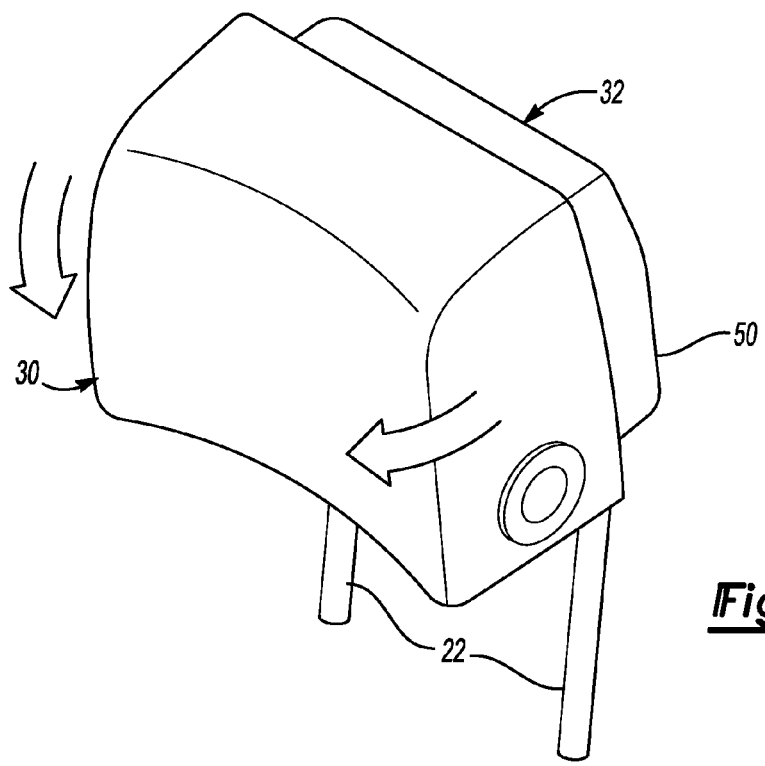
FIGS. 3a and 3b are perspective and side views of the head restraint assembly disposed in an extended position.

Detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Referring to FIG. 1, an exemplary seat assembly 10 is shown. The seat assembly 10 may be configured for use in a vehicle, such as a motor vehicle like a car or truck.

The seat assembly 10 may include a seat bottom 12 and a seat back 14. The seat bottom 12 may be configured to be mounted on a support surface, such as a floor pan of a vehicle. The seat back 14 may be pivotally disposed on the seat bottom 12 and may include a head restraint assembly 16.

Referring to FIGS. 2a and 2b, the head restraint assembly 16 may include a headrest 20 and one or more support posts 22. The headrest 20 may be moveably disposed on the support posts 22 as will be described in more detail below. The support posts 22 may be disposed on the seat back 14 may be made of any suitable material or materials, such as a metal or metal alloy. The support posts 22 may include a lower portion 24 and an upper portion 26.

The lower portion 24 may be configured as one or more tubes and may be generally linear in one or more embodiments. The lower portion 24 may extend through the top of the seat back 14. In addition, the lower portion 24 may be fixedly mounted to a structural frame of the seat back 14 such that the support posts 22 do not move with respect to the seat back 14. Alternatively, the lower portion 24 may move with respect to the seat back 14 in one or more embodiments. For instance, the lower portion 24 may be disposed in a guide sleeve that is disposed on the frame of the seat back 14.

Figure 7:
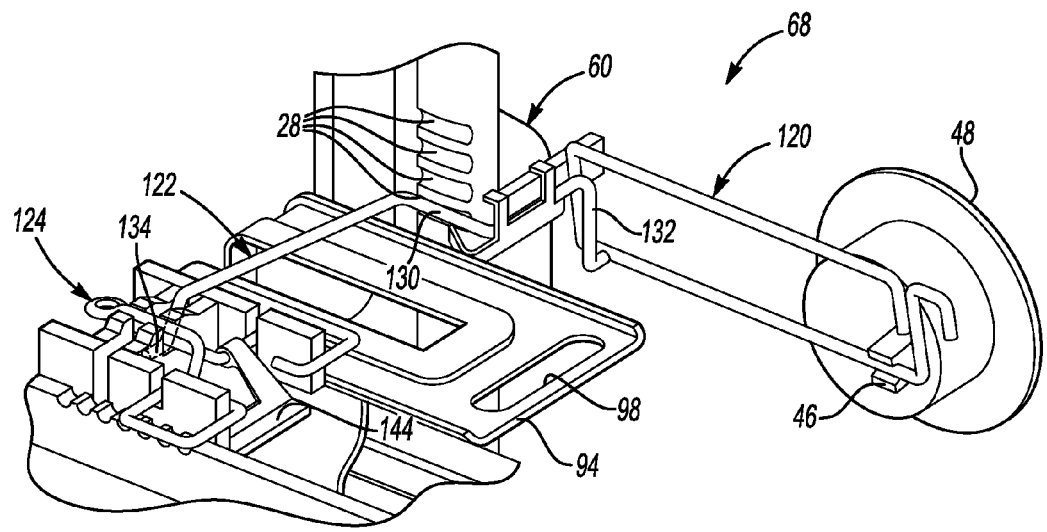
FIG. 7 is a fragmentary perspective view of a portion of the head restraint assembly showing a latch subsystem.

The upper portion 26 may or may not be coaxially disposed with the lower portion 24. In addition, the upper portion 26 may be generally U-shaped such that the upper portion 26 extends between or connects a plurality of lower portions 24 as is best shown in FIG. 4. In at least one embodiment, the upper portion 26 may extend at an angle from the lower portion 24, such as at an obtuse angle as shown in FIG. 2b. In addition, the upper portion 26 of at least one support post 22 may include a plurality of notches 28 in one or more embodiments. The notches 28, which are best shown in FIG. 7, may be spaced apart from each other and may provide predetermined positions at which the headrest 20 may be positioned along the support post 22.

The headrest 20 may be configured to support the head of an occupant of the seat assembly 10. The headrest 20 may include a front portion 30 and a rear portion 32. The front portion 30 may be moveable with respect to the rear portion 32 as will be discussed in more detail below.

The front portion 30 may face toward the head of a seat occupant. In at least one embodiment, the front portion 30 may have an opening 40 that faces toward and may at least partially receive the rear portion 32. The front portion 30 may include a trim cover 42 that covers its visible exterior surface. The trim cover 42 may be made of any suitable material or materials, such as a fabric, vinyl, leather, or the like. The trim cover 42 may cover a cushion 44 that may be disposed under at least a portion of the trim cover 42. The trim cover 42 may extend over the front and rear portions 30, 32 to provide a more uniform appearance similar to that shown in FIG. 1.

The front portion 30 may also include an input device, such as a button 46. In the embodiment shown in FIGS. 2a and 2b, the button 46 extends at least partially through a hole in a side of the front portion 30. A bezel 48 may be provided that extends at least partially around the button 46 to facilitate mounting and help provide a desired aesthetic appearance. The button 46 may be part of a latch subsystem that will be described in more detail below.

Figure 3B:
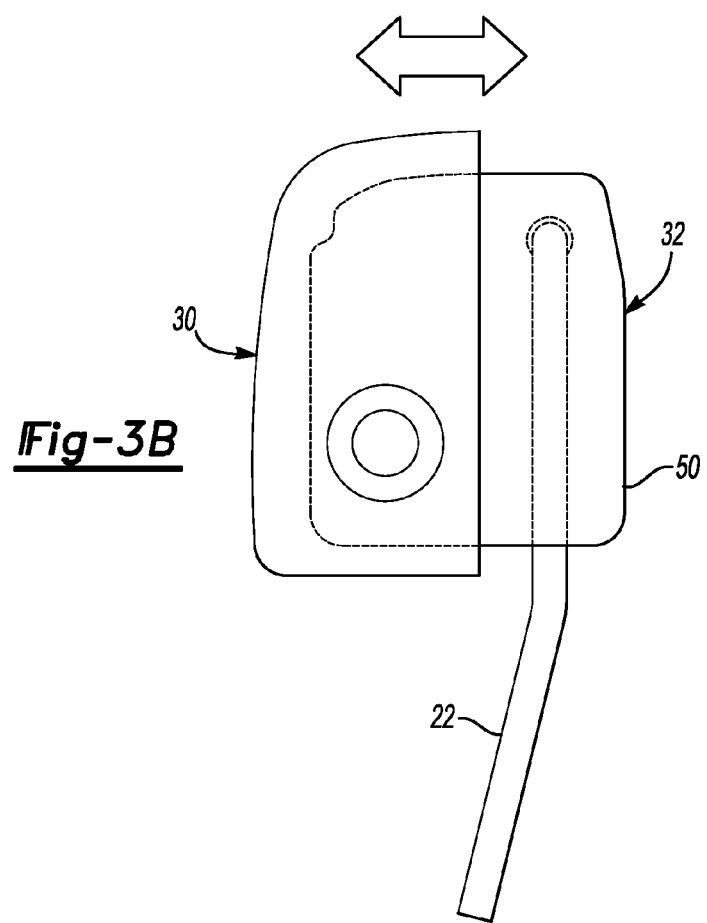

Referring to FIGS. 3a and 3b, the rear portion 32 may include an outer shell or cover 50 that covers at least a portion of its visible exterior surface and at least partially defines an opening that faces toward the front portion 30.

Movement of the front portion 30 with respect to the rear portion 32 is highlighted by comparing FIGS. 2a and 2b with FIGS. 3a and 3b. The front portion 30 can move in at least two different ways. First, the front portion 30 may move substantially linearly toward or away from the rear portion 32 as is best shown in FIGS. 2b and 3b and represented by the horizontal straight arrow line in FIG. 3b. Second, the front portion 30 may flex or fold when it moves toward or away from the rear portion 32. For example, lateral sides of the front portion 30 may move angularly, such as by flexing or folding forward and inward toward the center of the front portion 30 as is represented by the curved arrow lines in FIG. 3a. In at least one embodiment, at least a portion of a front surface of the front portion 30 may be generally planar when in the retracted position and may become curved or more U-shaped when in the extended position. The front portion 30 may simultaneously move away from the rear portion 32 and fold angularly as will be described in more detail below.

Referring to FIGS. 4 and 5, internal components of the head restraint assembly 16 are shown in more detail. Internal components that may be concealed within the headrest 20 may include a subframe 60, a support frame 62, a pivot member 64, a support linkage 66, and a latch subsystem 68.

The subframe 60 may be moveably disposed on the support post 22. For instance, the subframe 60 may be disposed on the upper portion 26 such that the subframe 60 may rotate with respect to the support post 22. In the embodiment shown in FIG. 4, a friction element 70 is provided that couples the subframe 60 to the support post 22. The friction element 70 may extend around the upper portion 26 and may allow the subframe 60 to tilt or rotate about an axis of rotation 72. The friction element 70 may generally hold the subframe 60 at a desired angle with respect to the support post 22 unless a sufficient force is provided to move the headrest 20 and subframe 60 toward or away from the support post 22. The friction element 70 may be coupled to the subframe 60 in any suitable manner, such as with a fastener 74. In addition, at least one free end of the friction element 70 may extend through a slot in the subframe 60 to facilitate orientation and mounting.

The subframe 60 may include first and second side portions 80, 82. The first and second side portions 80, 82 may be disposed at opposite ends or sides of the subframe 60. The first and second side portions 80, 82 may be configured to contact at least one side or surface of the support post 22. For instance, the first and/or second side portions 80, 82 may contact a front side of the support post 22 to inhibit rotation of the subframe 60 past a predetermined angle or position. In addition, the first and second side portions 80, 82 may extend at least partially around the support post 22. For example, a portion of the first and/or second side portions 80, 82 may have a generally L-shaped or U-shaped cross section such as when viewed from above. As such, the first and/or second side portions 80, 82 may help inhibit lateral or sideways movement of the subframe 60 with respect to the support post 22. In addition, the subframe 60 may facilitate mounting of at least a portion of the latch subsystem 68 as will be described in more detail below.

The subframe 60 may also include a center portion 84 that extends between the first and second side portions 80, 82. The center portion 84 may be spaced apart from the portion of the subframe 60 that receives the friction element 70.

Figure 6:
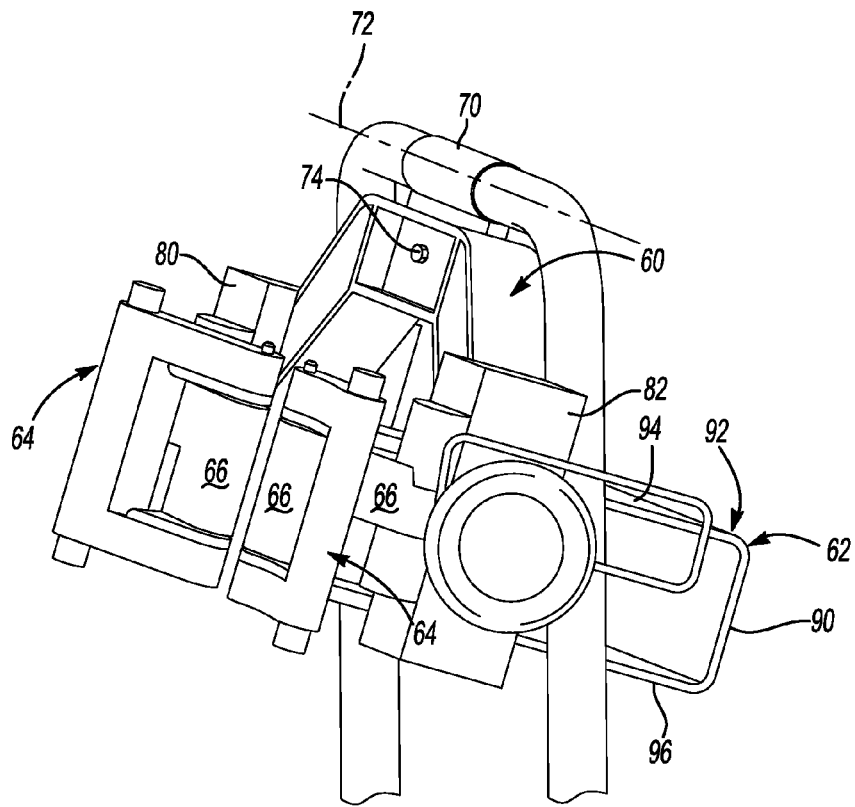
FIG. 6 is a fragmentary perspective view of a portion of the head restraint assembly disposed in the retracted position and tilted away from a support post.

Tilting or rotational movement of the subframe 60 and the headrest 20 is best shown by comparing FIGS. 4 and 6. FIG. 4 illustrates the head restraint assembly 16 in the retracted position as in FIGS. 2a and 2b. In addition, FIG. 4 illustrates the head restraint assembly 16 in a pretilt position in which the subframe 60 may contact the support post 22 and be generally aligned with and/or extend parallel to the upper portion 32. The head restraint assembly 16 is shown in an exemplary rotated or tilted position in FIG. 6 in which the subframe 60 is rotated about the axis of rotation 72 such that at least a portion of the subframe 60 and headrest 20 are moved away from the support post 22. Tilting or rotational movement may be achieved independently of or in conjunction with vertical movement of the head restraint assembly 16 in which the headrest may move toward or away from the seat back 14 and/or the linear or angular folding of the front portion 30 as will be described in more detail below.

Referring to FIGS. 4-6, an exemplary support frame 62 is shown. The support frame 62 may be disposed on or integrally formed with the subframe 60. The support frame 62 may be made of any suitable material, such as a metal like an aluminum alloy or a polymeric material. In addition, the outer cover 50 may be mounted on the support frame 62. The support frame 62 may have any suitable configuration. In the embodiment shown, the support frame 62 includes a back wall 90, and one or more sets of mounting arms 92.

The back wall 90 may extend generally along the back of the rear portion 32. The back wall 90 may be located between the outer cover 50 and the support posts 22. The bottom of the back wall 90 may be generally disposed behind the subframe 60 in one or more embodiments of the present invention. One or more openings may be provided in the back wall 90 to help reduce weight and material costs.

One or more sets of mounting arms 92 may be provided and may help couple the support frame 62 to the subframe 60. In the embodiment shown, two sets of mounting arms 92 are provided that extend from the back wall 90 toward the front portion 30. Each set 92 may include one or more arms. For example, each set may include an upper arm 94 and a lower arm 96. The upper and lower arms 94, 96 may be spaced apart from each other and may extend substantially parallel to each other. The center portion 74 may be disposed between the sets of mounting arms 92 in one or more embodiments of the present invention. As such, the upper and lower arms 94, 96 may facilitate mounting of the support frame 62 by capturing the subframe 60. In addition or alternatively, the upper arm 94 and/or lower arm 96 may be associated with one or more fasteners and/or include mating or mounting features that help couple the support frame 62 to the subframe 60.

Figure 8:
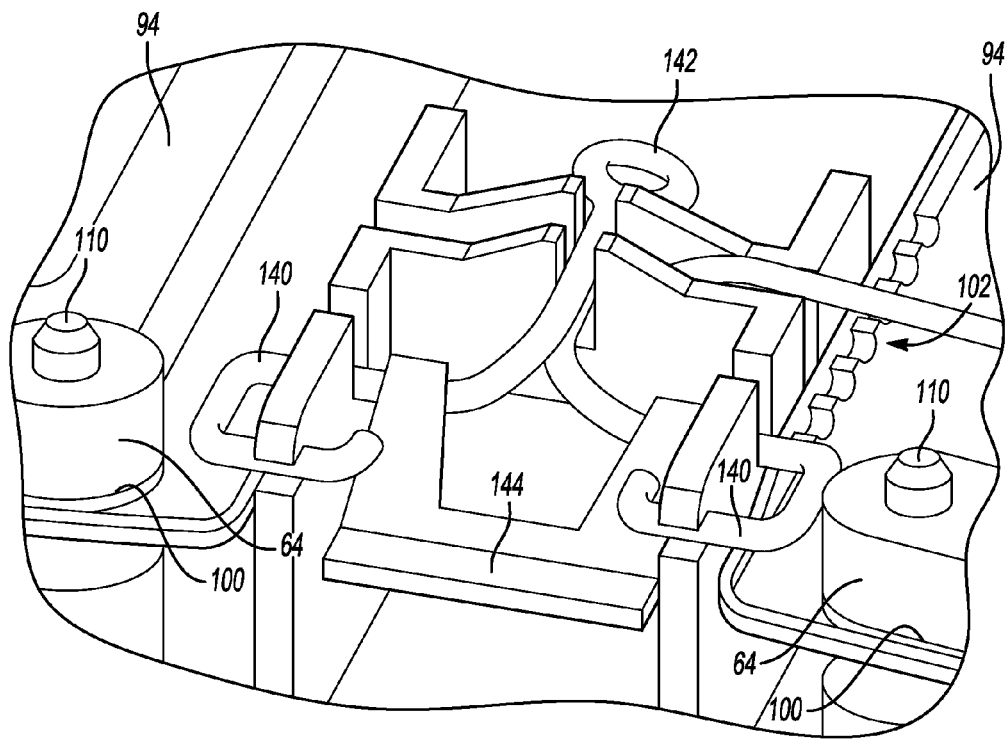
FIGS. 8 and 9 are magnified perspective views of a portion of the latch subsystem.

The upper and lower arms 94, 96 may each have distal ends that include a slot 98. The slots 98 in the upper and lower arms 94, 96 may be similarly configured and may be aligned with each other. In addition, the slots 98 may have an elongated configuration such that the slots 98 extend along a front edge of the upper and lower arms 94, 96. A bushing 100 may be associated with one or more slots 98 to provide a bearing surface as is best shown in FIG. 8. The bushing 100 may include an opening that has a similar configuration as an associated slot 98.

Figure 9:
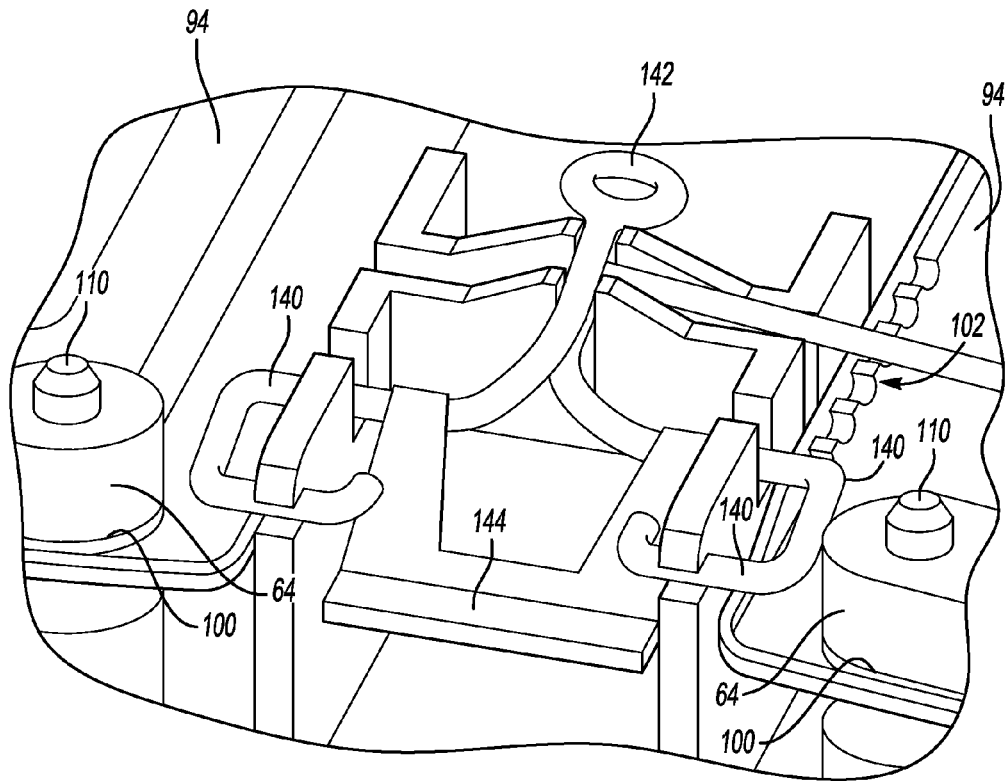

One or more arms may include a set of teeth 102 as is best shown in FIGS. 8 and 9. In the embodiment shown, the upper arms 94 each have a set of teeth 102. The set of teeth 102 may cooperate with the latch subsystem 68 to allow the front portion 30 to be secured in predetermined discrete positions.

Referring to FIGS. 4-6, one or more pivot members 64 may be provided that facilitate angular movement of the front portion 30. In the embodiment shown, two pivot members 64 are provided. The pivot members 64 may include features 104 such as protrusions that may engage the front portion 30. In addition, the pivot members 64 may include one or more mounting features, such as a first mounting feature 106 and a second mounting feature 108. The first and second mounting features 106, 108 may be spaced apart from each other and may include first and second openings, respectively. The first and second openings may be coaxially disposed and may receive a pivot pin 110.

The support linkage 66 may be provided to help support and/or control movement of an associated pivot member 64. The support linkage 66 may be rotatably disposed on the subframe 60. For example, a support linkage 66 may be received in the subframe 60 in a manner that permits rotational movement, such as with a pin. In addition, the support linkage 66 may include a second hole that is generally disposed at an end of the support linkage 66 opposite the first hole and receives the pivot pin 110. In at least one embodiment, the second end of the support linkage 66 may be disposed between the first and second mounting features 106, 108. In addition, the support linkage 66 may contact the support frame 62 to transmit force between and synchronize movement of the pivot member 64 and the support frame 62.

The pivot pin 110 may couple the support frame 62, pivot member 64 and support linkage 66. For example, the pivot pin 110 may extend into the slots 98 in the upper and lower arms 94, 96. The slots 98 may help constrain and guide movement of the pivot pin 110. For instance, the pivot pin 110 may slide within the slot 98 such that the pivot pin 110 is disposed near or at a first end of the slot 98 located near the center of the head restraint assembly 16 when in the retracted position as shown in FIG. 4. The pivot pin 110 may be disposed near a second end of the slot 98 that is disposed opposite the first end when in the extended position as shown in FIG. 5.

Referring primarily to FIGS. 7-9, an embodiment of a latch subsystem 68 is shown that may be provided to help enable and disable movement of the head restraint assembly 16. More specifically, the latch subsystem 68 may move between a latched position in which movement of the head restraint assembly 16 is disabled and an unlatched position in which movement of the head restraint assembly 16 in one or more directions is enabled. In at least one embodiment, the latch subsystem 68 includes one or more coupling members, such as a first coupling member 120, a second coupling member 122, and a third coupling member 124. Alternatively, the latch subsystem 68 may be provided with a different mechanical linkage, such as one or more cables, or with an electrical or electromechanical actuator. For instance, an electrical machine, such as a motor or solenoid, may be provided that latches or actuates a latch to enable or disable movement of the head restraint assembly 16.

The first coupling member 120 may be moveably disposed on a portion of the head restraint assembly 16, such as the subframe 60. In addition, the first coupling member 120 may engage or be coupled to the button 46. For example, the first coupling member 120 may be fastened to the button 46 and subframe 60 in any suitable manner, such as with a fastener or snap fit into a slot in the button 46. The first coupling member 120 may have any suitable configuration. For example, the first coupling member 120 may be provided as a wire that is formed in a generally rectangular shape in one or more embodiments of the present invention.

The second coupling member 122 may be moveably associated with the first coupling member 120. In addition, the second coupling member 122 may be adapted to permit or inhibit movement of the head restraint assembly 16. For instance, the second coupling member 122 may include a support post engagement portion 130 that disables movement along the support posts 22 when it engages a support post notch 28 and permits movement along the support posts 22 when it does not engage a notch 28. The support post engagement portion 130 may be disposed between a first end 132 and a second end 134 of the second coupling member 122 disposed opposite the first end 132. The first end 132 may be configured to engage the first coupling member 120. The second end 134 may be configured to engage the third coupling member 124. As such, the second coupling member 122 may extend from the first coupling member 120 toward the center portion 74 of the subframe 60. In at least one embodiment, the second end 134 may be disposed at an angle relative to an adjacent portion of the second coupling member 122. In FIG. 7, the second end 134 is disposed at an angle that may extend downward toward the subframe 60.

The second coupling member 122 may be disposed on the head restraint assembly 16 in any suitable manner. For example, a fastener 136 may be provided that couples the second coupling member 122 to the subframe 60. The fastener 136 may be provided as a clip and may permit the second coupling member 122 to slide along or within the fastener 136. In addition, the second coupling member 122 may engage or be received by part of the subframe 60 to help guide its movement.

The third coupling member 124 may be moveably associated with the second coupling member 122. In addition, the third coupling member 124 may be adapted to permit or inhibit movement of the head restraint assembly 16. For instance, the third coupling member 124 may include one or more tooth engagement portions 140 that disable movement of the front portion 30 when it engages a member of the set of teeth 102 as shown in FIG. 8. Moreover, movement of the front portion 30 may be enabled when the third coupling member 124 is disengaged from a member of the set of teeth 102 as shown in FIG. 9.

The third coupling member 124 may have any suitable configuration. In the embodiment shown in FIGS. 7-9, the third coupling member 124 is generally wishbone shaped and has an engagement portion 142 that is configured to be engaged by the second coupling member 122. The engagement portion 142 may be received by or extend through one or more slots in the subframe 60 to help position third coupling member 124. The third coupling member 124 may be generally symmetrically disposed about the engagement portion 142 and may be pivotally mounted on a portion of the head restraint assembly 16, such as the subframe 60. For example, the third coupling member 124 may be pivotally disposed or snap fit into one or more slots.

A spring 144 may be provided that exerts a biasing force on the third coupling member 124. The spring 144 may have any suitable configuration. In FIGS. 7-9, the spring 144 may be disposed on the subframe 60 and may bias the third coupling member 124 toward the set of teeth 102.

Operation of the head restraint assembly 16 in accordance with at least one embodiment may be described as follows. To enable movement of the head restraint assembly 16, the button 46 may be actuated. Actuation of the button 46 may exert force on the first coupling member 120 and move the first coupling member 120 toward the second coupling member 122. Actuation of the second coupling member 122 may disengage the support post engagement portion 130 from the support post 22 to enable vertical movement. In addition, actuation of the second coupling member 122 may move the second end 134 toward the third coupling member 124 to exert force on engagement portion 142. The third coupling member 124 disengages from the set of teeth 102 when the force is sufficient to overcome the biasing force of the spring 144. The front portion 30 is then free to move away from the rear portion 32, which may include linear and angular movement as previously discussed.

The head restraint assembly 16 may simultaneously move in multiple directions when the latch subsystem 68 is in the unlatched position. Such movement may be in response to force exerted by a seat occupant. Optionally, movement may be aided by or in response to force exerted by an actuator, such as an electrical or electromechanical actuator such as a motor, solenoid, spring, linkage, or the like.

Movement of the head restraint assembly 16 may be disabled when the latch subsystem 68 is in the latched position. For instance, the spring 144 may bias the third coupling member 124 into engagement with the set of teeth 102, bias the third coupling member 124 against the second coupling member 122 to actuate the second coupling member 122 against the support post 22, and bias the second coupling member 122 against the first coupling member 120 to return the button 46 and latch subsystem 68 to the latched position when a sufficient countervailing force is not provided.

Figure 10:
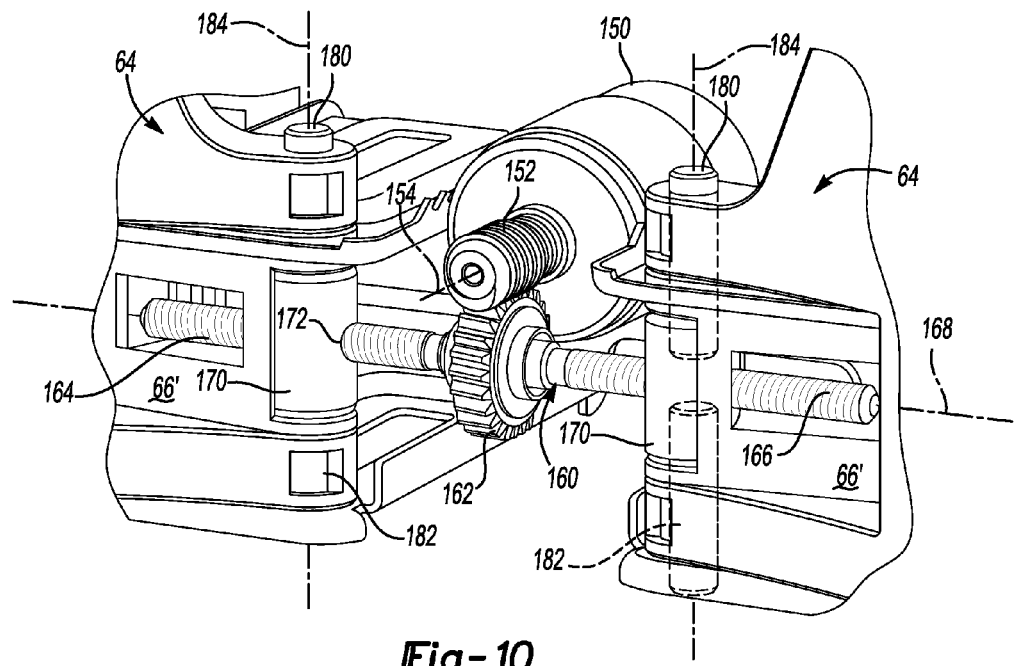
FIG. 10 is a fragmentary perspective view of a second embodiment of a head restraint assembly.

Referring to FIG. 10, a second embodiment of a head restraint assembly is shown. In this embodiment, the head restraint assembly may be electrically actuated.

An actuator 150 may be provided that may be used to actuate one or more components of the head restraint assembly. The actuator 150 may be disposed in any suitable location. For example, the actuator 150 may be mounted to the subframe 60 or the support frame 62. In at least one embodiment, the actuator 150 may be an electrical machine, such as a motor.

A first drive element 152 may be actuated by the actuator 150. In at least one embodiment, the first drive element 152 may be disposed on an output shaft of the actuator 150. The first drive element 152 may have any suitable configuration. For example, the first drive element 152 may be a gear like a worm gear and may be disposed along an axis 154.

A drive shaft 160 may be configured to be driven by the actuator 150. The drive shaft 160 may include a second drive element 162, and one or more threaded regions, such as first and second threaded regions 164, 166. In addition, the drive shaft 160 may be configured to rotate about an axis of rotation 168. In the embodiment shown, the axis of rotation 168 is generally perpendicular to axis 154.

The second drive element 162 may be fixedly disposed on the drive shaft 160. The second drive element 162 may have any suitable configuration that is compatible with the first drive element 152. For instance, the second drive element 162 may be configured as a gear such as a helical gear. The second drive element 162 may cooperate with the first drive element 152 to inhibit movement of the drive shaft 160 when a sufficient actuation force is not provided.

The first and second threaded regions 164, 166 may coaxially disposed. In addition, the first and second threaded regions 164, 166 may be threaded in different manners, such as with left and right hand threads to facilitate simultaneous actuation of multiple pivot members 64.

An insert nut 170 may be associated with a threaded region of the drive shaft 160. For instance, an insert nut 170 may include a threaded hole 172 that receives a threaded region 164, 166 of the drive shaft 160. The insert nut 170 may be received by a support linkage 66'. Moreover, the insert nut 170 may be adapted to pivot or rotate with respect to an associated support linkage 66' to permit smooth operation and inhibit binding of the drive shaft 160 and an insert nut 170. The insert nut 170 may be disposed on the support linkage 66' in any suitable manner. In the embodiment shown, first and second pivot pins 180, 182 couple an insert nut 170 to the support frame 62, pivot member 64 and support linkage 66', similar to pivot pin 110 described above. The first and second pivot pins 180, 182 may be disposed along a common axis of rotation 184 and may be spaced apart from the drive shaft 160.

In operation, an input signal may be provided to control operation of the actuator 150. For example, the input signal may be based on operation of a switch and/or a signal from a controller and may control the direction of rotation or movement of the actuator 150 and the first drive element 152. Rotation of the first drive element 152 may rotate the second drive element 162 and the drive shaft 160. Rotation of the drive shaft 160 may cause the first and second threaded regions 164, 166 to exert force on their associated insert nuts 170. The force exerted on the insert nuts 170 may then actuate the pivot member 64 and support linkage 66'. More specifically, rotation of the drive shaft 160 in a first direction may actuate the support linkage 66' toward the extended position. Rotation of the drive shaft 160 in a second direction that is opposite the first direction may actuate the support linkage 66' toward the retracted position.

Figure 11:
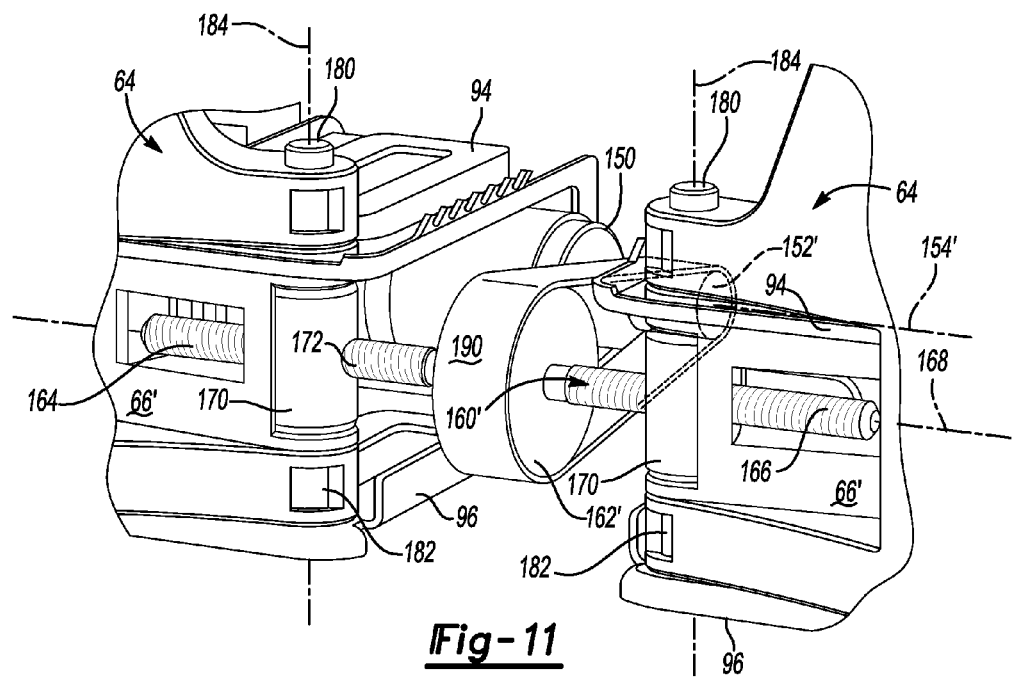
FIG. 11 is a fragmentary perspective view of a third embodiment of a head restraint assembly.

Referring to FIG. 11, a third embodiment of a head restraint assembly is shown. This embodiment is similar to that shown in FIG. 10, but illustrates an alternative actuator orientation and drive system. For example, the actuator 150 may be disposed between the upper and lower arms 94, 96 of the support frame 62. The present invention also contemplates different mounting positions, such as above or below the support frame 62. The actuator 150 may include an output shaft that includes a first drive element 152' that rotates about an axis 154'. The drive shaft 160' may include a second drive element 162'. The first and second drive elements 152', 162' may have generally cylindrical configurations and may be coupled by a belt 190. The drive shaft 160' may rotate about an axis of rotation 168 that may be substantially parallel to axis 154'.

Figure 12:
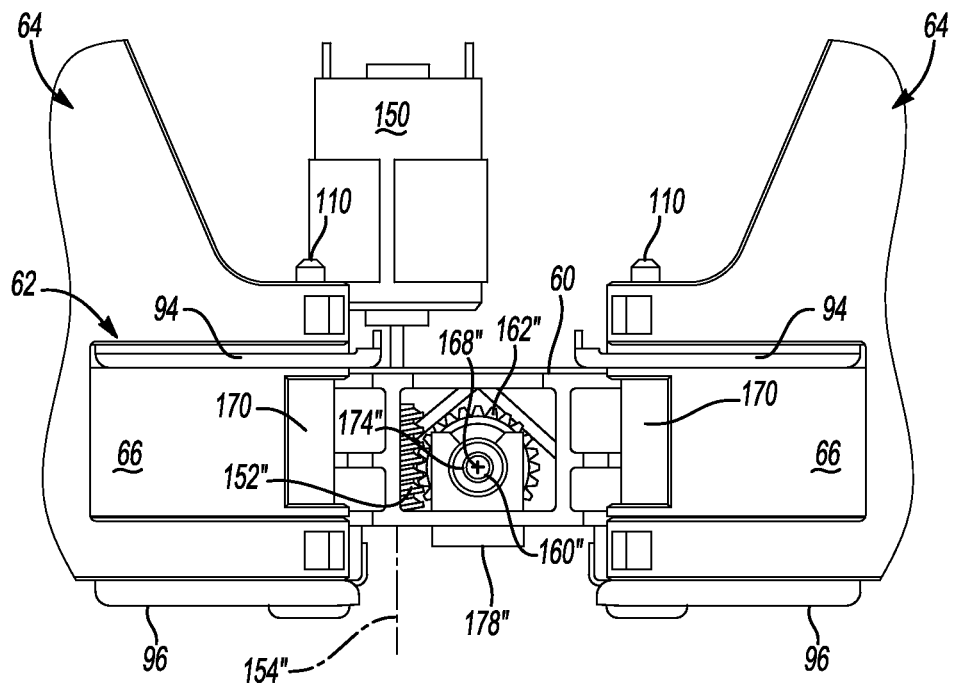
FIG. 12 is a fragmentary front side view of a fourth embodiment of a head restraint assembly.
Figure 13:
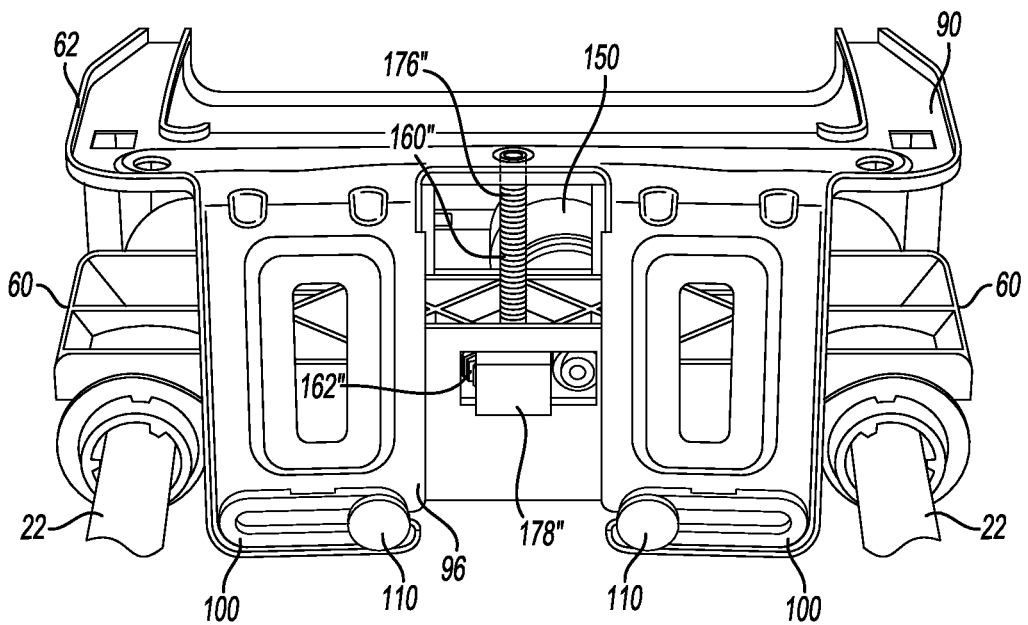
FIG. 13 is a fragmentary perspective view of the fourth embodiment of the head restraint assembly.

Referring to FIGS. 12 and 13, a fourth embodiment of a head restraint assembly is shown. In this embodiment, the actuator 150 is disposed generally above the support frame 62. The present invention also contemplates different mounting positions, such as generally below or within the support frame 62. The actuator 150 may include an output shaft that may include a first drive element 152" that rotates about axis 154" similar to FIG. 10.

A drive shaft 160" may be fixedly disposed on the support frame 62. For instance, an end of the drive shaft 160" may be mounted on the back wall 90. The drive shaft 160" may include a second drive element 162". The second drive element 162" may be moveably disposed on the drive shaft 160". For instance, the second drive element 162" may include a threaded hole 174" that engages a threaded region 176" of the drive shaft 160". The second drive element 162" may also be configured to engage the first drive element 152". For instance, the second drive element 162" may any configuration that is compatible with the first drive element 152". In FIGS. 12 and 13, the second drive element 162" has a surface that is configured as a gear.

The drive shaft 160" and/or the second drive element 162" may be rotatably supported by a mounting bracket 178". The second drive element 162" may rotate about an axis of rotation 168" that may be substantially perpendicular to the axis 154" of rotation of the actuator 150 and/or first drive element 152". The mounting bracket 178" may be disposed in any suitable location, such as on the subframe 60.

Movement of the actuator 150 may rotate the first drive element 152" which in turn rotates the second drive element 162". The second drive element 162" may be held in rotatable engagement with the first drive element 152" by the mounting bracket 178". Rotation of the second drive element 162" may cause the threaded hole 174" to exert force on the drive shaft 160" which then actuates the support frame 62 relative to the subframe 60. More specifically, rotation of the drive shaft 160" in a first direction may actuate the support frame 62 away from the subframe 60, which in turn may cause the support linkage 66 and pivot member 64 to move toward the extended position. Rotation of the drive shaft 160" in a second direction that is opposite the first direction may actuate the support frame 62 towards the subframe 60, which in turn may cause the support linkage 66 and pivot member 64 toward the retracted position.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A seat assembly comprising:
   a seat back;
   a support post disposed on the seat back; and
   a headrest that includes:
      a subframe that is rotatably disposed on the support post;
      a front portion for supporting a head of a seat occupant;
      a support frame that is disposed on the subframe and that does not engage the support post or the front portion;
      a friction element that is disposed on the subframe and the support post, wherein the friction element permits the headrest to rotate when a sufficient force is applied and inhibits rotation of the headrest when sufficient force is not applied to the headrest; and
      a pivot member that is rotatably disposed on the support frame and that couples the support frame to the front portion;
   wherein the subframe engages the support post and is completely disposed below an axis of rotation when in a first rotational position and is spaced apart from the support post when disposed in a second rotational position; and
   wherein the front portion is configured to move with respect to the subframe between a first position and a second position that differs from the first position and wherein the headrest is rotatably disposed on the support post such that the headrest rotates independent of movement of the front portion.

2. The seat assembly of claim 1 wherein the headrest rotates about the axis of rotation that extends through the support post.

3. The seat assembly of claim 1 wherein the headrest has a rear portion and wherein the subframe is disposed completely inside the front and rear portions.

4. The seat assembly of claim 3 wherein the subframe includes a first side portion and a second side portion disposed opposite the first side portion, wherein the first and second side portions each receive upper portions of the support post to inhibit lateral movement of the subframe with respect to the support post.

5. The seat assembly of claim 1 wherein the pivot member engages the front portion of the headrest and slides along a slot in the support frame when the front portion moves between the first and second positions.

6. The seat assembly of claim 5 further comprising a pivot pin that extends into the slot and the pivot member to permit the pivot member to rotate as the pivot member moves along the slot.

7. The seat assembly of claim 1 further comprising a support linkage rotatably disposed on the subframe and moveably associated with the pivot member.

8. The seat assembly of claim 1 further comprising a latch mechanism at least partially disposed within the headrest, the latch mechanism being moveable between a latched position and an unlatched position, wherein the headrest is simultaneously moveable in multiple directions when the latch mechanism is disposed in the unlatched position.

9. The seat assembly of claim 1 wherein the subframe, support frame, and pivot member are disposed in the headrest.

10. The seat assembly of claim 1 further comprising:
    a drive shaft fixedly disposed on the support frame and having a threaded region; and
    a second drive element having a threaded hole that receives the threaded region.

11. The seat assembly of claim 10 further comprising a motor and a first drive element configured to be driven by the motor, wherein the second drive element is configured to be driven by the first drive element to rotate the drive shaft and actuate the front portion between the first position and the second position.

12. A seat assembly comprising:
    a seat back; and
    a head restraint assembly including:
        a headrest for supporting a head of a seat occupant;
        a support post disposed in the headrest and extending from the seat back;
        a subframe rotatably disposed on the support post;
        a pivot member that engages and is moveable with respect to the subframe, the pivot member being configured to engage the headrest;
        a support linkage rotatably disposed on the subframe and moveably associated with the pivot member;
        an insert nut that is disposed proximate the support linkage and has a threaded hole; and
        a drive shaft having a threaded region that engages the threaded hole and rotates about a drive shaft axis of rotation to actuate the support linkage;

wherein movement of the pivot member with respect to the subframe is independent of rotation of subframe with respect to the support post.

13. The seat assembly of claim 12 wherein the insert nut is rotatably disposed in the support linkage.

14. The seat assembly of claim 13 further comprising a pivot pin that extends at least partially through the insert nut to permit the insert nut to rotate with respect to the support linkage.

15. The seat assembly of claim 14 wherein the pivot pin extends at least partially through the support linkage and the pivot member to permit the pivot member to rotate with respect to the support linkage.

16. The seat assembly of claim 13 wherein the drive shaft extends through the support linkage.

17. The seat assembly of claim 12 further comprising a motor configured to actuate the drive shaft.

18. The seat assembly of claim 17 wherein the motor is configured to drive a first drive element and the drive shaft includes a second drive element, wherein the first and second drive elements are coupled by a belt.

19. The seat assembly of claim 17 wherein the motor is configured to drive a first drive element and the drive shaft includes a second drive element, wherein the first and second drive elements are configured as gears that engage each other.

* * * * *